(12) United States Patent
Arunachalam

(10) Patent No.: US 12,111,757 B2
(45) Date of Patent: Oct. 8, 2024

(54) FLUID MEMORY FOR HIGH PERFORMANCE COMPUTING APPLICATIONS

(71) Applicant: HEWLETT PACKARD ENTERPRISE DEVELOPMENT LP, Houston, TX (US)

(72) Inventor: Somasundaram Arunachalam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 64 days.

(21) Appl. No.: 17/971,834

(22) Filed: Oct. 24, 2022

(65) Prior Publication Data

US 2024/0134787 A1 Apr. 25, 2024
US 2024/0232065 A9 Jul. 11, 2024

(51) Int. Cl.
*G06F 12/02* (2006.01)
(52) U.S. Cl.
CPC .... *G06F 12/023* (2013.01); *G06F 2212/1041* (2013.01)
(58) Field of Classification Search
CPC ............ G06F 12/023; G06F 2212/1041
See application file for complete search history.

(56) References Cited

U.S. PATENT DOCUMENTS

| | | |
|---|---|---|
| 6,253,226 B1 * | 6/2001 | Chidambaran ....... G06F 12/023 707/999.103 |
| 9,355,035 B2 | 5/2016 | Goodman et al. |
| 10,896,715 B2 | 1/2021 | Golov |
| 11,334,436 B2 | 5/2022 | Suryanarayana et al. |
| 2009/0037660 A1 | 2/2009 | Fairhurst |
| 2010/0185810 A1 | 7/2010 | Cline et al. |
| 2021/0173796 A1 | 6/2021 | Puthoor et al. |

OTHER PUBLICATIONS

The DBOS Committee, "DBOS: A Proposal for a Data-Centric Operating System", Jul. 21, 2020, 20 pages.

* cited by examiner

*Primary Examiner* — Edward J Dudek, Jr.
(74) *Attorney, Agent, or Firm* — Dickinson Wright

(57) ABSTRACT

Examples of the presently disclosed technology provide new memory management systems and methods that improve dynamic memory region utilization by: (1) creating a new class/type of dynamic memory regions—i.e., "fluid" dynamic memory regions—that are automatically relinquished to a free pool of dynamic memory regions upon expiration of a "fluid memory validity time interval;" and (2) responsive to requests for dynamic memory regions, allocating "fluid" dynamic memory regions when levels of importance for data to be stored in the requested dynamic memory regions fall below a "data-oriented priority-fluidity threshold."

18 Claims, 7 Drawing Sheets

FLUID MEMORY FOR HIGH PERFORMANCE COMPUTING APPLICATIONS

BACKGROUND

High Performance Computing (HPC) may refer to computing solutions (e.g., supercomputers or clusters of computing nodes) that are able to process data and execute calculations at a rate that far exceeds other computing solutions. Examples of HPC applications include software applications (run on supercomputers or computing node clusters) that model/simulate complex natural systems, genome sequencing, molecular dynamics, etc.

Dynamic memory may refer to computer memory regions that are allocated and/or deallocated (dynamically) during run-time of an application. Dynamic memory can be volatile memory (i.e., computer memory such as random-access-memory (RAM) that requires power to store information) or non-volatile (i.e., computer memory such as non-volatile DIMM (NVDIMM) that stores information even after computer power has been shut off).

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
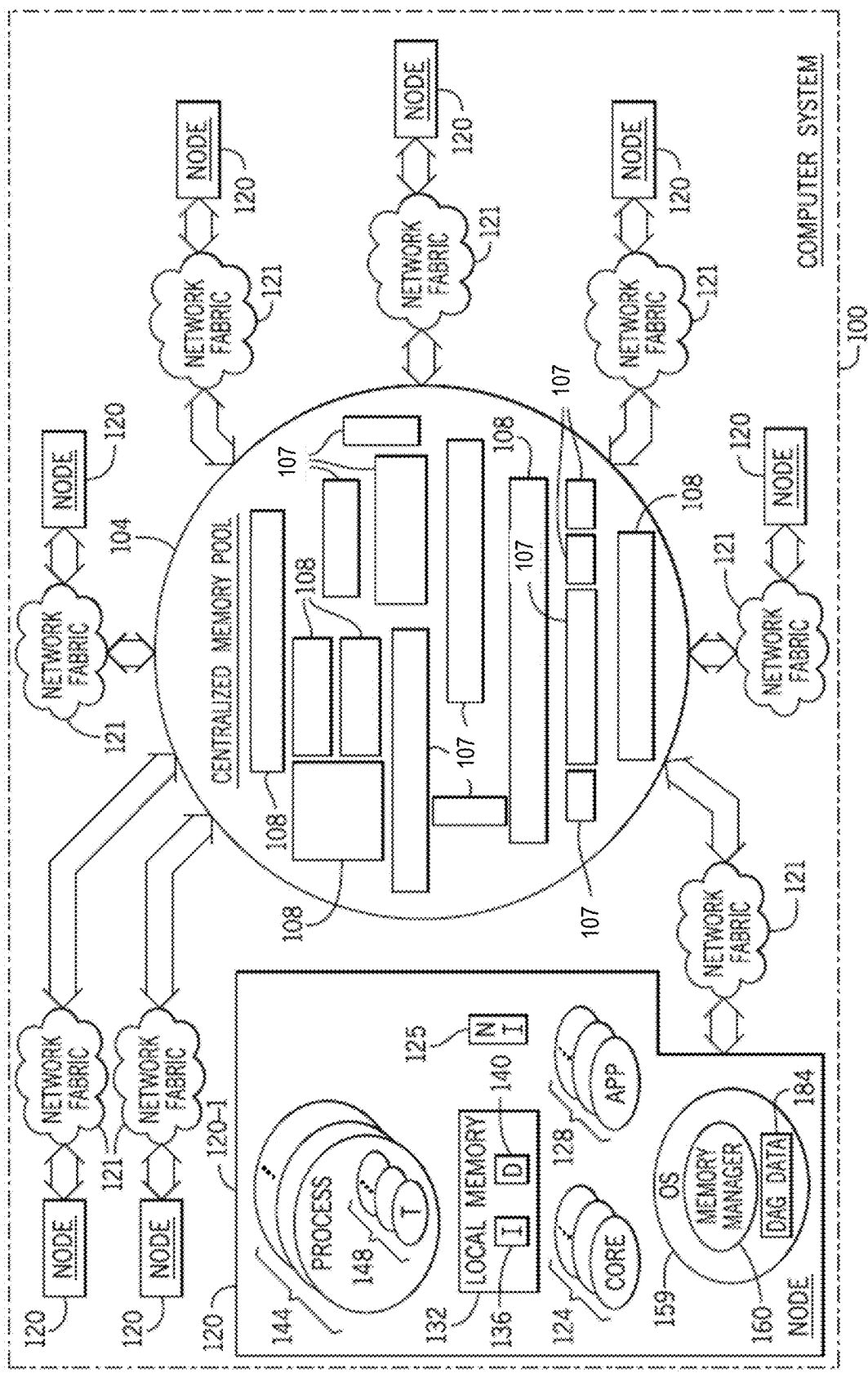
FIG. 1 is a schematic diagram of a memory-oriented distributed computing system having a centralized memory pool that includes fluid and non-fluid dynamic memory regions, in accordance with various examples of the presently disclosed technology.

The figures are not exhaustive and do not limit the present disclosure to the precise form disclosed.

DETAILED DESCRIPTION

Recent advancements in HPC have enabled science, business, and engineering organizations to solve enormous computational problems that have been unapproachable historically. Examples of HPC applications include software applications (run on supercomputers or clusters of computing nodes) that model/simulate complex natural systems, genome sequencing, molecular dynamics, etc.

In many cases, the above described HPC applications run continuously for months or even years. During these extended, continuous run-times, HPC applications process/produce massive amounts of data which in many cases evolves over the course of the HPC applications' run-times (for example, and as will be described in greater detail below, an HPC application often creates and then processes large numbers of nearly congruent "parallel" datasets which may be transformations/modifications of previously processed datasets—minute differences across certain parallel datasets may be analytically/inferentially significant for the HPC application at an early time interval of the HPC application's run-time, but less analytically/inferentially significant at a later time interval). Accordingly, HPC applications can require significant dynamic memory regions (e.g., on the order of exabytes) to store this massive amount of evolving data. Unfortunately, existing memory management technologies have struggled to keep pace with recent advancements in HPC and HPC system architectures—and their increasing demands for, and utilizations of, dynamic memory regions.

Existing dynamic memory management technologies commonly utilize a passive memory manager (e.g., a computing system, or an operating system's subsystem, utilized for memory management) that only allocates or deallocates dynamic memory regions in response to explicit requests/instructions from computing entities (e.g., software applications, containers, virtual machines, computing nodes, etc.) that share common dynamic memory regions. Relying on explicit requests/instructions from a computing entity in order to deallocate dynamic memory regions (allocated to the computing entity) can be problematic for a few reasons. For example, the computing entity may be running mission critical/real-time functional executions/transformations for an application, and thus may be unable to deviate from its functional flow to request/instruct the passive memory manager to deallocate a dynamic memory region no longer being used by the computing entity. Relatedly, even when the computing entity is able to break its functional flow to request/instruct the passive memory manager to deallocate a dynamic memory region, such a break in the computing entity's functional flow can cause increased latency for the application. In many HPC applications, achieving a correct result in a quick response time is critical, and can be a measure of accuracy/utility for real-time mission critical HPC applications. Thus, increased latency resulting from breaks in functional flow to request/instruct the passive memory manager to deallocate a dynamic memory region, can be a major hindrance for such HPC applications.

Active dynamic memory management (where e.g., the memory manager actively/selectively deallocates dynamic memory regions that have not been accessed for long periods of time) is challenging/infeasible for many memory management systems (including memory driven computing systems) where a memory manager can be tasked within managing a central pool of millions/billions of dynamic memory regions shared by large numbers of computing/supercomputing entities.

These problems can be particularly acute for memory management systems (e.g., memory-driven computing systems) that manage dynamic memory resources for HPC applications. As alluded to above, HPC applications can require storage of enormous amounts of data throughout their extended run-times. A unique feature/computational requirement of HPC applications is that they often require analysis and storage of vast numbers of large, "parallel datasets" that diminish in importance over the course of the HPC applications' extended run-times (as used herein parallel datasets may refer to nearly-congruent datasets describing a common characteristic/attribute—many parallel datasets may be transformations/modifications of previously processed datasets). For example, at an early time interval of a run-time for an HPC application (which can be on the scale of months or years), minute differences between a first set of parallel datasets may be analytically/inferentially significant for the HPC application when e.g., determining future state transitions while running an experiment or simulation of a model. However, the analytical/inferential significance of these minute differences tends to diminish over the course of the HPC application's run-time (for example, having determined a first set of state transitions based on analysis of minute differences between the first set of parallel datasets, the HPC application may move on to analyzing a second set of parallel datasets produced from the first set of state transitions in order to determine a new/second set of state transitions). Accordingly, levels of importance for many (or all) of the first set of parallel datasets will also diminish over time. A short-coming of existing (passive) memory management systems is that unless they receive explicit instructions/requests to deallocate dynamic memory regions storing these diminishing-in-importance parallel datasets, the dynamic memory regions will remain allocated over the entire course of the months or years-long run-time of the HPC application (as alluded to above, in many cases an HPC application will be unable to deviate from its mission-critical/real-time functional flow to request/instruct a passive memory manager to deallocate a dynamic memory region no longer being used by the HPC application). This inefficient use of valuable dynamic memory regions can be a significant drain on the shared dynamic memory regions/shared memory fabric managed by the memory management system—which can increase monetary costs of storage, increase the amount of time it takes the memory management system to provide access to dynamic memory regions, etc. Relatedly, even when an HPC application is able to break its functional flow to request/instruct a passive memory manager to deallocate a dynamic memory region, such a break in the HPC application's functional flow can cause increased latency for the HPC application. As described above, in many HPC applications, achieving a correct result in a quick response time is critical, and can be a measure of accuracy/utility for real-time mission critical HPC applications. Thus, increased latency resulting from breaks in functional flow to request/instruct the passive memory manager to deallocate a dynamic memory region, can be a major hindrance for such HPC applications.

Against this backdrop, examples of the presently disclosed technology provide new memory management systems and methods that improve dynamic memory region utilization by: (1) providing a new class/type of dynamic memory regions—i.e., "fluid" dynamic memory regions—that are automatically relinquished (i.e., deallocated) to a free pool of dynamic memory regions upon expiration of a "fluid memory validity time interval" (as used herein a "fluid memory validity time interval" may refer to a time interval a fluid dynamic memory region remains allocated before it is relinquished/deallocated to a free pool of dynamic memory regions—example fluid memory validity time intervals may include a number of days, weeks, months, years, etc.); and (2) responsive to requests for dynamic memory regions, allocating "fluid" dynamic memory regions when levels of importance for data to be stored in the requested dynamic memory regions fall below a threshold level of importance. In some examples, the fluid memory validity time intervals may be on the order of seconds, minutes, or hours.

For instance, a presently disclosed memory management system may first receive a request (e.g., from a computing entity or other processing device) for a dynamic memory region, the request including a data-oriented priority value measuring a level of importance for data to be stored in the requested dynamic memory region. The memory management system may then compare the data-oriented priority value to a data-oriented priority-fluidity threshold. If the data-oriented priority value is on a first side of the data-oriented priority-fluidity threshold (i.e., if the level of importance measured by the data-oriented priority value fails to exceed a threshold level of importance measured by the data-oriented priority-fluidity threshold), the memory management system may allocate a fluid dynamic memory region for the data. By contrast, if the data-oriented priority value is on a second side of the data-oriented priority-fluidity threshold (i.e., if the level of importance measured by the data-oriented priority value exceeds the threshold level of importance measured by the data-oriented priority-fluidity threshold), the memory management system may allocate a non-fluid dynamic memory region for the data. As alluded to above, upon expiration of a fluid memory validity time interval for an allocated fluid dynamic memory region, the allocated fluid dynamic memory region will be automatically relinquished to a free pool of dynamic memory regions (i.e., the allocated fluid dynamic memory region will automatically be relinquished/deallocated and become a free dynamic memory region in the pool of free dynamic memory regions). In various instances, the memory management system may determine the fluid memory validity time interval for the allocated fluid dynamic memory region based on the data-oriented priority value for the data (e.g., the determined fluid memory validity time interval may increase as the level of importance for data increases). In certain cases, the memory management system may store/organize unique identifier(s) for the allocated fluid dynamic memory region according to the data-oriented priority value such that the memory management system can provide access to the allocated fluid dynamic memory region more quickly than for other allocated fluid dynamic memory regions having data-oriented priority values measuring lower levels of importance.

Examples of the presently disclosed technology may also include computing entities (e.g., software applications, containers, virtual machines, computing nodes, etc.) that collaborate with a memory management system to improve resource utilization for dynamic memory regions. For instance, such a computing entity may request, from a memory management system, information related to a data-oriented priority-fluidity threshold (e.g., ranges of data-oriented priority values for fluid dynamic memory storage and ranges of data-oriented priority values for non-fluid dynamic memory storage). Based on this information and various application-specific and dataset-specific factors, the computing entity can determine a data-oriented priority value for a dataset. The computing entity can then include the determined data-oriented priority value in a request (sent to the memory management system) for a dynamic memory region for storing the dataset. In certain cases, the computing entity's request may also specify a type of dynamic memory region (i.e., fluid vs. non-fluid). When requesting a fluid dynamic memory region, the request may also include a desired/specified fluid memory validity time interval. The memory management system may then allocate a dynamic memory region (fluid or non-fluid) responsive to the computing entity's request.

As alluded to above, the presently disclosed memory management systems are particularly well-suited for managing dynamic memory regions for HPC applications. Specifically, examples can improve management for HPC applications by allocating fluid dynamic memory regions to store the diminishing-in-importance-over-time parallel datasets commonly processed/produced by HPC applications. Fluid memory validity time intervals for these allocated fluid dynamic memory regions can be calibrated/determined on an HPC application-specific basis by either the memory management system or an HPC entity/application requesting dynamic memory regions. For example, a presently disclosed memory management system may learn/predict that a genome sequencing HPC application typically accesses/utilizes parallel datasets for approximately two weeks before moving on to newer/more recently transformed parallel datasets (as alluded to above, this may be the case because the parallel datasets diminish in analytical/inferential significance for the HPC application over a relatively consistent two-week time frame). The memory management system may then calibrate/determine a fluid memory validity time interval of three weeks for fluid dynamic memory regions allocated for the genome sequencing HPC application (here the memory management system may build a one-week buffer into the fluid memory validity time interval so that data is not automatically deleted prematurely—i.e., while the HPC application still needs to access/process the data). In a related example, the genome sequencing HPC application may predict that it will continue to process/utilize a particular key dataset for a two-month time interval (i.e., the genome sequencing HPC application may predict that the key dataset will not diminish in importance until expiration of a two-month period). Accordingly, when requesting a dynamic memory region for storing the key dataset, the genome sequencing HPC application may request e.g., a three-month fluid memory validity time interval for the key dataset. Alternatively (or in addition to requesting a longer fluid memory validity time interval for the key dataset), the genome sequencing HPC application may include a higher data-oriented priority value in its request for a dynamic memory region to store the key dataset. Based on the higher data-oriented priority value for the key dataset, the memory management system can determine/calibrate a longer fluid memory validity time interval when allocating a fluid dynamic memory region for the key dataset. In some examples, the memory management system can adjust/reset a fluid memory validity time interval for an allocated fluid memory region in response to a request/instruction from an HPC application. For example, due to a change in functional state of the HPC application, the HPC application may predict that certain data stored in allocated fluid dynamic memory regions may be analytically/inferentially significant for a longer time interval. Accordingly, the HPC application may request longer fluid memory validity time intervals for those allocated fluid dynamic memory regions, and the memory management system may adjust the fluid memory validity time intervals in accordance with the HPC application's request.

In various cases, examples can be specially adapted to improve other innovative dynamic memory region management systems/techniques, such as orthogonal memory lane-based memory management. As used herein, orthogonal memory lane-based memory management may refer to a virtual memory management scheme (also called a "memory lane-based virtualization") in which virtual memory is allocated in hierarchical memory lane structures. For example, a memory lane structure may be organized as a hierarchical tree of memory lanes, including a "main memory lane" and one or multiple additional memory lanes, called "memory sub-lanes." A main memory lane and a memory sub-lane are both examples of "memory lanes." The main memory lane may correspond to the root node of the hierarchical tree. The one or multiple memory sub-lanes are descendants of the main memory lane and correspond to other non-root nodes of the hierarchical tree. In this context, a "descendant" of a memory lane, such as the main memory lane, refers to a direct descendent, or child, of the memory lane, as well as an indirect descendent (e.g., a grandchild or great grandchild) of the memory lane. A given memory sub-lane may correspond to a leaf node and have no children, and another given memory sub-lane may be a parent to one or multiple children. Here, a first memory lane being "orthogonal" to a second memory lane refers to no overlap existing between a contiguous set of virtual memory addresses assigned to the first memory lane and a contiguous set of virtual memory addresses assigned to the second memory lane. Moreover, because none of the assigned sets of virtual memory addresses overlap, all of the memory lanes of a memory lane structure should be orthogonal with respect to each other.

As will be described in greater detail below, like memory management systems of the presently disclosed technology, orthogonal memory lane-based memory management is particularly well-suited for improving dynamic memory sources management for HPC applications that process/produce large numbers of parallel datasets during their extended run-times.

Examples can be adapted to improve orthogonal memory lane-based memory management in various ways. For example, a first set of memory sub-lanes may be designated as non-fluid memory sub-lanes. By contrast, a second set of memory sub-lanes directly may be designated as fluid memory sub-lanes. Accordingly, during the run-time of an HPC application, these non-fluid and fluid memory sub-lanes may be allocated to parallel datasets according to the parallel datasets' respective data-oriented priority values (i.e., their analytical importance/significance to the application). As will be described in greater detail below, memory sub-lanes which descendent from the non-fluid memory sub-lanes may also be designated as non-fluid memory sub-lanes, and may have the same data-oriented priority values as their ancestors. Similarly, memory sub-lanes which descendent from the fluid memory sub-lanes may also be designated as fluid memory sub-lanes, and may have the same data-oriented priority values and fluid memory validity time intervals as their ancestors.

Examples of the presently disclosed technology provide numerous advantages over existing memory management systems. As alluded to above, the presently disclosed memory management systems can improve dynamic memory region utilization because they do not require explicit requests/instructions from a computing entity before deallocating memory regions used by the computing entity. Accordingly, examples can reduce drains on dynamic memory regions caused when various computing entities fail to notify memory management systems when they are no longer using data stored in allocated dynamic memory regions (as described above, in certain cases a computing entity running an HPC application may be unable to deviate from its mission-critical/real-time functional flow to request/instruct a passive memory manager to deallocate a dynamic memory region no longer being used by the computing entity/HPC application). By reducing this inefficient use of valuable dynamic memory regions, examples can reduce monetary costs of memory storage, reduce the amount of time it takes a memory management system to provide access to memory regions, etc. Relatedly, by not requiring a computing entity/application to deviate from its mission-critical/real-time functional flow in order to make a deallocation request/instruction, examples can improve latency and accuracy for scientific models and simulations run by the computing entity/application.

Also, by leveraging a fluid memory validity time interval (determined/configured at allocation) to automate the deallocation process, the presently disclosed memory management systems can reduce the occurrence of "memory leak" (as used herein memory leak may refer to resource leak that occurs when a computer program incorrectly manages memory allocations in a way that memory which is no longer needed is not released/relinquished)—which is another common cause of inefficient resource utilization for dynamic memory regions. In other words, by not requiring explicit and individualized action by the memory management system in order to deallocate fluid memory regions, examples can reduce the occurrence of memory leak, thereby reducing inefficient use of memory regions, reducing monetary costs of memory storage, reducing the amount of time it takes a memory management system to provide access to memory regions, etc. Where hundreds of millions of dynamic memory regions can be present as architectural elements in certain scientific models and simulations, reduced memory leak can provide a pronounced benefit in terms of reduction of latency, ease of automated memory management, simplification of HPC application design, etc.

Before describing examples of the presently disclosed technology in greater detail, it should be understood how memory management systems of the presently disclosed technology are distinct from a few memory management systems/techniques that examples of the presently disclosed technology could potentially be confused with.

As a first example, volatile memory devices (e.g., random-access-memory (RAM) or dynamic-random-access-memory (DRAM)) are sometimes labeled "dynamic" memory storage devices because they only store information when power is on—and can update stored information during run-time of an application. However, unlike examples of the presently disclosed technology, conventional volatile memory devices/systems do not include "fluid" memory regions (i.e., memory regions which are automatically relinquished to a free pool of memory regions upon expiration of a determined/calibrated time period), and generally do not consider the relative importance of data to be stored in memory regions when allocating the memory regions (and/or storing/organizing unique identifiers used for accessing the memory regions). Also, as alluded to above, these conventional systems generally: (1) require explicit requests/instructions from a computing entity before deallocating memory regions used by the computing entity; and (2) require explicit and individualized action by the memory management system in order to deallocate the memory regions. This is distinct from examples of the presently disclosed technology which importantly: (1) do not require explicit requests/instructions from a computing entity before deallocating fluid memory regions used by the computing entity; and (2) do not require explicit and individualized action by the memory management system in order to deallocate fluid memory regions (instead fluid memory regions are automatically deallocated/relinquished upon expiration of a fluid memory validity time interval determined/configured at allocation).

As a second example, time to live (TTL) is a concept used in caching systems where a data object is stored in a caching system for a set amount of time (i.e., a TTL) before it is deleted. Data caching is used in various memory hardware systems such as RAM. Unlike examples of the presently disclosed technology, conventional TTL techniques/data caching systems do not consider the relative importance of data when setting a TTL, nor is there any intelligence/data-specific determination involved in deciding whether an individual data should be deleted after a set time period. Relatedly, unlike the fluid memory validity time interval of the presently disclosed technology, TTL is generally not modifiable (i.e., it cannot be modified/reset), nor is it specifically calibrated/determined on a data-specific or application-specific basis. TTL/data caching is also utilized in an entirely different technical context than examples of the presently disclosed technology. In particular, TTL/data caching is not used for allocating/deallocating dynamic memory regions. Instead, the most common example of TTL is in the networking context where each data packet transferred within a network is given the same, small-scale (e.g., sub-second) TTL to prevent the data packets from circulating indefinitely. This is contrast to fluid memory validity time interval of the presently disclosed technology which can be on the scale of days, weeks, months, etc. Relatedly, unlike examples of the presently disclosed technology, TTL is only used for caching small amounts of data (as compared to the large-scale data storage of the presently disclosed technology). In sum, examples of the presently disclosed technology are distinct from caching/TTL in both operation/sophistication and technical application. In particular, only examples of the presently technology: (1) provide a new class/type of dynamic memory regions—i.e., "fluid" dynamic memory regions—that are automatically relinquished to a free pool of dynamic memory regions upon expiration of a "fluid memory validity time interval;" and (2) responsive to requests for dynamic memory regions, allocate "fluid" dynamic memory regions vs. non-fluid dynamic regions based on measured levels of importance of data to be stored in the requested dynamic memory regions.

FIG. 1 is a schematic diagram of a memory-oriented distributed computing system having a centralized and shared memory pool that includes fluid and non-fluid dynamic memory regions, in accordance with various examples of the presently disclosed technology.

Referring to FIG. 1, a computer system 100 (e.g., a memory-oriented computing system or a memory driven computing system) includes nodes 120 and a centralized memory pool 104, which is shared by the nodes 120. The nodes 120 may access the memory pool 104 via relatively high bandwidth network fabric 121, such as Gen-Z fabric, HPE Slingshot, or other network fabric. The memory pool 104 may be abstracted, or virtualized, by a memory manager 160. The memory pool 104 may include physical storage devices that corresponds to a heterogeneous or a homogeneous collection of physical, non-transitory storage media devices.

As examples, the physical, non-transitory storage media devices may include one or more of the following: semiconductor storage devices, memristor-based devices, magnetic storage devices, phase change memory devices, a combination of devices of one or more of these storage technologies, storage devices for other storage technologies, and so forth. The physical, non-transitory storage media devices may be volatile memory devices, non-volatile memory devices, or a combination of volatile and non-volatile memory devices. The non-transitory storage media devices may be part of storage arrays, as well as other types of storage subsystems.

A node 120 may be a computer platform (e.g., a blade server, a laptop, a router, a rack-based server, a gateway, a supercomputer and so forth), a subpart of a computer platform (e.g., a compute node corresponding to one or multiple processing cores of a blade server), or multiple computer platforms (e.g., a compute node corresponding to a cluster). Some of the nodes 120 may be compute nodes, and in some examples one or multiple nodes 120 may be administrative nodes. In certain examples, the nodes 120 may comprise a cluster of computing nodes.

As depicted in FIG. 1, a given node 120-1 may include one or multiple processing cores 124 (e.g., one or multiple central processing unit (CPU) semiconductor packages, one or multiple CPU cores, and so forth), which execute machine-executable instructions 136 (or "software") for purposes of forming one or more software components. As examples, these components may include one or multiple applications 128, one or multiple processes 144, one or multiple threads 148 of the processes 144, an operating system 159, one or multiple containers, one or multiple virtual machines, and so forth. In the execution of the machine-executable instructions 136, the processing core(s) 124 may, through a network interface 125 of the node 120-1, access the memory pool 104. As also depicted in FIG. 1, the node 120-1 may have a local memory 132 that stores the machine-executable instructions 136, data 140, and so forth. Other nodes 120 of the computer system 100 may have a similar architecture and similar components to the illustrated node 120-1. In some examples, software components illustrated on the node 120-1 may be distributed components, such as, for example, the operating system 159 may be a component of a distributed operating system (i.e., an operating system that is distributed among the nodes 120), the applications 128 may be components of distributed applications, and so forth.

The memory manager 160 performs memory management for the computer system 100, e.g., allocates unused dynamic memory regions from the memory pool 104 to entities of the computer system 100, deallocates dynamic memory regions to return the dynamic memory regions back to the memory pool 104, and manages access to the memory pool 104. For the particular implementation that is illustrated in FIG. 1, the memory manager 160 is part of the node 120-1 and may be part of the operating system 159. In accordance with some implementations, the operating system 159 may be a distributed operating system that is distributed among multiple nodes 120. As such, multiple nodes 120 may have operating system 159 components and corresponding memory manager 160 components. Therefore, in general, a "memory manager" refers to a single or distributed entity to manage dynamic memory, where the "managing" may include one or multiple of the following: allocating dynamic memory regions responsive to requests (from e.g., applications 128 run on nodes 120), deallocating dynamic memory regions (automatically for fluid dynamic memory regions 107 upon expiration of fluid memory validity time intervals), managing requests to access dynamic memory regions, and performing virtual-to-physical address translations. In some examples, the memory manager 160 (e.g., the memory manager of an HPC environment) may be part of the memory fabric, e.g., a single or distributed entity that is part of the network fabric 121 and/or memory pool 104.

As part of the memory management, the memory manager 160 allocates dynamic memory regions for entities of the computer system 100 from unused dynamic memory regions of the centralized memory pool 104, deallocates dynamic memory regions to return the dynamic memory regions to the unused memory portion of the memory pool 104 (automatically for fluid dynamic memory regions 107), and manages virtual-to-physical memory address translations for memory accesses (e.g., read and write accesses). In accordance with some implementations, the memory manager 160 employs a superset virtualization (e.g., fluid vs. non-fluid virtualization) and within this virtualization, the memory manager 160 may employ another virtual memory management scheme (e.g., a page table-based memory management scheme).

Pursuant to the virtualizations, the memory manager 160 can allocate fluid and non-fluid dynamic memory regions for entities of the computer system 100. In accordance with example implementations, the memory manager 160 may allocate a dynamic memory region for a computing entity in response to a memory allocation request. In this context, a "computing entity" refers to any hardware or software component of the computer system 100 that may provide a request to access the memory pool 104. As examples, the computing entities may include applications 128, threads 148, processes 144, containers, virtual memories, nodes 120, and so forth.

A dynamic memory allocation request, in accordance with some implementations, may be submitted by the computing entity (e.g., submitted by the entity executing machine executable instructions that generate the memory allocation request) or may be submitted on behalf of a computing entity (e.g., submitted by a compiler). In response to an allocation request, the memory manager 160 allocates dynamic memory regions for the computing entity. The allocated dynamic memory region may be a fluid dynamic memory region 107 or a non-fluid dynamic memory region 108. As described above, fluid dynamic memory regions 107 may be configured with fluid memory validity time intervals, wherein upon expiration of their respective fluid memory validity time intervals, allocated fluid dynamic memory regions 107 are relinquished to the unused/free portion of centralized memory pool 104. In accordance with some implementations, the dynamic memory regions 107/108 may be invisible to the computing entity, as the allocation request may result in the memory manager 160 providing a contiguous range of allocated virtual memory addresses (corresponding to the allocated dynamic memory regions 107/108) to the computing entity. In accordance with further implementations, the memory manager 160 may allocate a given dynamic memory regions for a specific component (e.g., a computer node 120 or application executing on the computer node 120) and allocate sub-components (e.g., memory sub-lanes) of the dynamic memory region to different subcomponents (e.g., threads, processes, applications and so forth) of the component.

Figure 2:
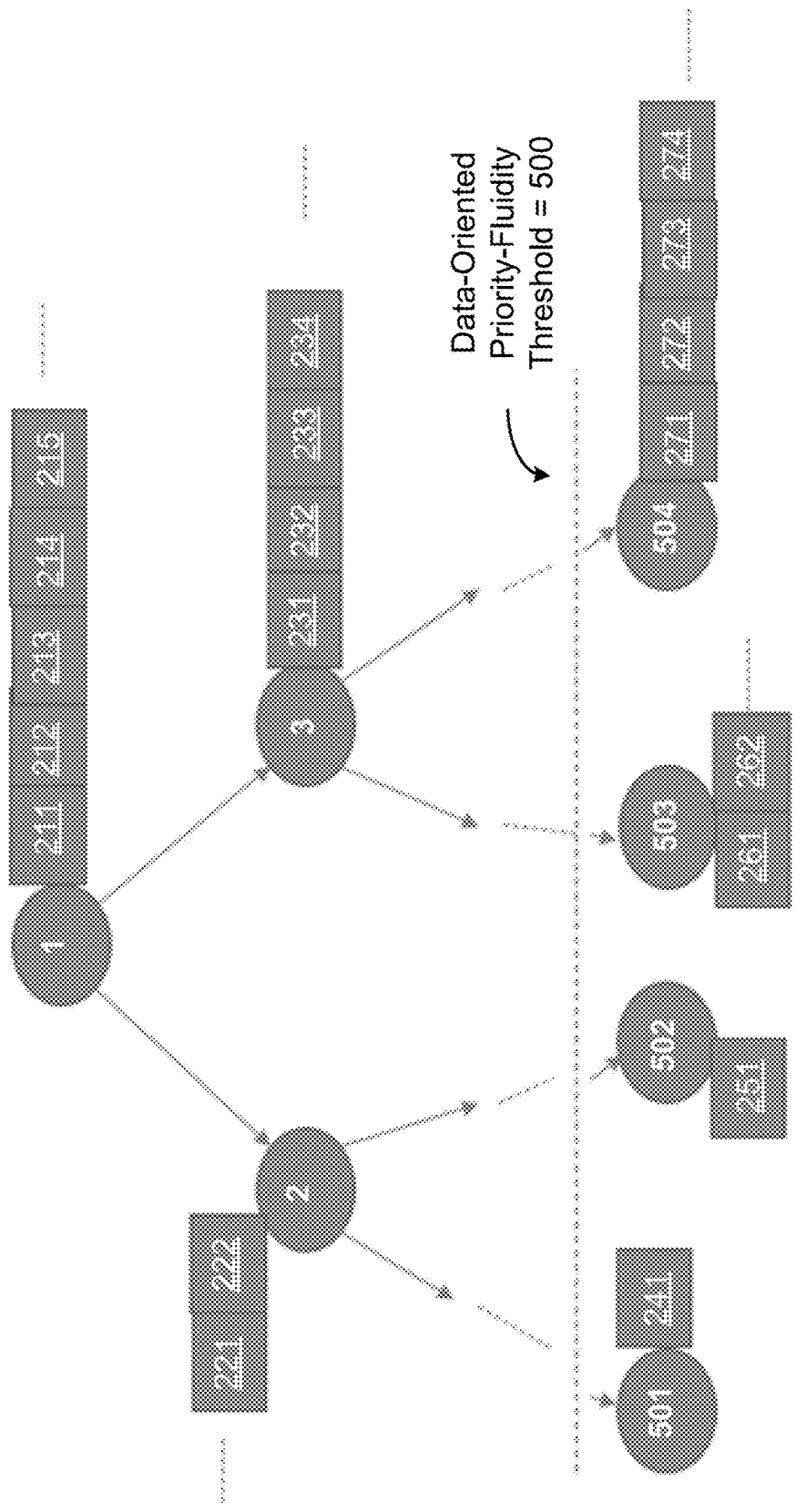
FIG. 2 is a conceptual diagram depicting an example data-oriented priority hierarchy for fluid and non-fluid dynamic memory regions, in accordance with examples of the presently disclosed technology.

FIG. 2 is a conceptual diagram depicting an example data-oriented priority hierarchy 200 for fluid and non-fluid dynamic memory regions, in accordance with examples of the presently disclosed technology. Here, data-oriented priority hierarchy 200 is "data-oriented" because it arranges memory regions according to levels of importance of the data they store.

As alluded to above, examples of the presently disclosed technology provide new memory management systems and methods that improve dynamic memory region utilization by: (1) providing a new class/type of dynamic memory regions—i.e., "fluid" dynamic memory regions—that are automatically relinquished to a free pool of dynamic memory regions upon expiration of a "fluid memory validity time interval;" and (2) responsive to requests for dynamic memory regions, allocating "fluid" dynamic memory regions when levels of importance for data to be stored in the requested dynamic memory regions fall below a threshold level. In other words, a presently disclosed memory management system may first receive a request (from e.g., a computing entity) for a dynamic memory region, the request including a data-oriented priority value measuring a level of importance for data to be stored in the requested dynamic memory region. The memory management system may then compare the data-oriented priority value to a data-oriented priority-fluidity threshold. If the data-oriented priority value is on a first side of the data-oriented priority-fluidity threshold (i.e., if the level of importance measured by the data-oriented priority value fails to exceed a threshold level of importance measured by the data-oriented priority-fluidity threshold), the memory management system may allocate a fluid dynamic memory region for the data. By contrast, if the data-oriented priority value is on a second side of the data-oriented priority-fluidity threshold (i.e., if the level of importance measured by the data-oriented priority value exceeds the threshold level of importance measured by the data-oriented priority-fluidity threshold), the memory management system may allocate a non-fluid dynamic memory region for the data. As alluded to above, upon expiration of a fluid memory validity time interval for an allocated fluid dynamic memory region, the allocated fluid dynamic memory region will be automatically relinquished to a free pool of dynamic memory regions. By contrast, a non-fluid dynamic memory region may only be deallocated/relinquished in response to an explicit request/instruction from a computing entity utilizing the non-fluid dynamic memory region.

As depicted, data-oriented priority hierarchy 200 represents a collection of allocated dynamic memory regions arranged according to their respective data-oriented priority levels, and relatedly, their respective fluid vs. non-fluid designations. In various examples, the allocated dynamic memory regions may be managed by a memory manager (e.g., memory manager 160 of FIG. 1) and may be part of a centralized memory pool (e.g., centralized memory pool 104 of FIG. 1) shared across multiple computing entities (e.g., nodes 120 of FIG. 1).

FIG. 2 also depicts the data-oriented priority-fluidity threshold used to separate non-fluid and fluid memory regions for data-oriented priority hierarchy 200. In the specific example of FIG. 2, the data-oriented priority-fluidity threshold is 500. In the specific example of FIG. 2, data-oriented priority values lower than 500 (i.e., data-oriented priority values 1-499) measure a higher level of importance than the data-oriented priority-fluidity threshold of 500. On the other hand, data-oriented priority values higher than 500 (i.e., data-oriented priority values 501 and above) measure a lower level of importance than the data-oriented priority-fluidity threshold of 500. In other words, the data-oriented priority value of "1" measures the highest level of importance/priority, the data-oriented priority value of "2" measures the next highest level of importance/priority, and so on. It should be understood that various examples may utilize different measurement schemes for data-oriented priority values where e.g., increasing numerical values measure increasing/higher levels of importance for stored data. Relatedly, in other examples data-oriented priority values may comprise non-integer values, zero and negative numerical values, etc.

As depicted in the conceptual diagram of FIG. 2, non-fluid dynamic memory regions 211-215, 221-222, and 231-234 lie above the data-oriented priority-fluidity threshold of 500. Non-fluid dynamic memory regions 211-215 each have a data-oriented priority level of "1." In the specific example of FIG. 2, this means that the data stored by non-fluid dynamic memory regions 211-215 is of the highest importance/priority. Non-fluid dynamic memory regions 231-234 each have a data-oriented priority level of "3." In the specific example of FIG. 2, this means that the data stored by non-fluid dynamic memory regions 231-234 is of lower importance/priority than the data stored in non-fluid dynamic memory regions 211-215. Non-fluid dynamic memory regions 221-222 each have a data-oriented priority level of "2." In the specific example of FIG. 2, this means that the data stored by non-fluid dynamic memory regions 221-22 is of lower importance/priority than the data stored in non-fluid dynamic memory regions 211-215, but of higher importance/priority than the data stored in non-fluid dynamic memory regions 231-234. Again, while in the specific example of FIG. 2 decreasing numerical values for data-oriented priority levels measure increasing/higher importance/priority, it should be understood that in other examples increasing numerical values may measure increasing/higher importance/priority.

Fluid dynamic memory regions 241, 251, 261-262, and 271-274 are depicted below the data-oriented priority-fluidity threshold of 500. For example, fluid dynamic memory region 241 has a data-oriented priority level of "501." In the specific example of FIG. 1, this may mean that the data stored by fluid dynamic memory region 241 is of the highest importance/priority among data stored in fluid dynamic memory regions. The remaining fluid dynamic memory regions and their respective data-oriented priority values may follow the same/similar pattern as described in conjunction with the non-fluid dynamic memory regions of FIG. 2.

As alluded to above, in certain cases, a fluid memory validity time interval for a fluid dynamic memory region may be determined/calibrated based on its associated data-oriented priority value. For instance, fluid dynamic memory regions that store data of increasing/relatively higher importance/priority may be stored for longer time intervals before they are automatically relinquished into the free pool of dynamic memory regions. Accordingly, fluid dynamic memory region 241 may have a longer fluid memory validity time interval than fluid dynamic memory region 251, fluid dynamic memory region 251 may have a longer fluid memory validity time interval than fluid dynamic memory regions 261-262, and fluid dynamic memory regions 261-262 may have a longer fluid memory validity time interval than fluid dynamic memory regions 271-274, and so on.

In certain examples, unique identifiers used to access non-fluid and fluid dynamic memory regions may be organized/arranged (in e.g., a lookup table or hash table utilized in a memory manager/memory management system) according to respective data-oriented priority values for the non-fluid and fluid dynamic memory regions. For example, unique identifiers for dynamic memory regions storing data of higher importance (as measured by respective data-oriented priority values) may be organized/arranged (in e.g., a lookup table or hash table) such that the dynamic memory regions storing the higher importance data can be accessed more quickly than dynamic memory regions storing relatively less important data (again as measured by respective data-oriented priority values).

As alluded to above, in various examples a computing entity (e.g., a software application, container, virtual machine, computing node, etc.) may determine a data-oriented priority value for data and include the determined data-oriented priority value in a request (to e.g., a memory manager/memory management system) for a dynamic memory region for storing the data. The computing entity can use various criteria and application-specific and data-specific factors to make this determination. For example, the computing entity may consider confidentiality as well as relative-reliability of data, or whether the data's values lead to an important inference in an experiment. The computing entity may also consider the instantaneous value of the data obtained during a functional transformation, which may indicate whether the data will be a crucial/inevitable input for a future nth state transition involving e.g., a circuitous functional flow and functional transformations of the HPC application. The computing entity may also consider a data-oriented priority-fluidity threshold and/or known fluid memory validity time intervals when determining a data-oriented priority value for data.

In certain examples, the computing entity may request an update to a data-oriented priority value for an allocated dynamic memory region (and the data stored within). For example, a computing entity utilizing data stored in fluid dynamic memory region 241 may predict/determine an increase in importance for the data. Accordingly, the computing entity may request to update the data-oriented priority value for fluid dynamic memory region 241 to e.g., 99. Here, such an update would switch the designation of fluid dynamic memory region 241 from fluid to non-fluid. Accordingly, (now non-fluid) dynamic memory region 241 (and the data stored within) would no longer be automatically relinquished to the free pool of dynamic memory regions upon expiration of its (previous) fluid memory validity time interval. In other examples, where e.g., a computing entity predicts/determines a post-allocation decrease in importance for stored data, a requested update to a data-oriented priority value may switch the designation of a non-fluid dynamic memory region (and the data stored within) to fluid. Accordingly, a fluid memory validity time interval may be determined/configured for the newly fluid dynamic memory region.

Figure 3:
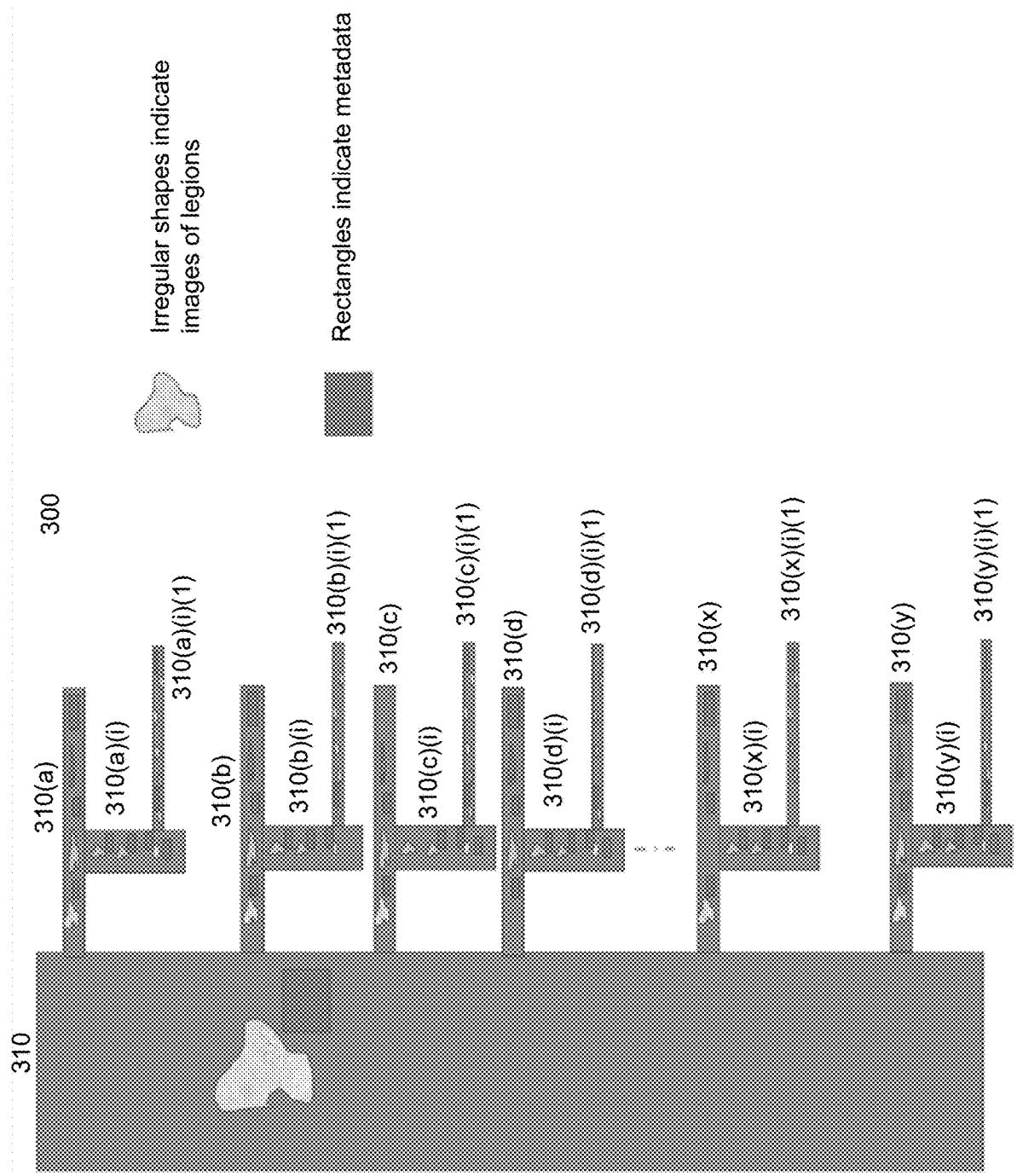
FIG. 3 is an example conceptual diagram depicting fluid and non-fluid memory sub-lanes, in accordance with examples of the presently disclosed technology.

FIG. 3 is an example conceptual diagram depicting fluid and non-fluid memory sub-lanes, in accordance with various examples of the presently disclosed technology.

As alluded to above, examples of the presently disclosed technology can be specially adapted to improve other innovative dynamic memory region management systems/techniques. For instance (and as depicted in FIG. 3), the presently disclosed memory management systems can adapt dynamic memory region fluidity to orthogonal memory lane-based memory management. As used herein, orthogonal memory lane-based memory management may refer to a virtual memory management scheme (also called a "memory lane-based virtualization") in which virtual memory is allocated in hierarchical memory lane structures. For example, a memory lane structure may be organized as a hierarchical tree of memory lanes, including a "main memory lane" (e.g., main memory lane 310) and one or multiple additional memory lanes, called "memory sub-lanes" (e.g., memory sub-lanes 310(a), 310(b), 310(c), etc.). A main memory lane and a memory sub-lane are both examples of "memory lanes." The main memory lane may correspond to the root node of the hierarchical tree. The one or multiple memory sub-lanes are descendants of the main memory lane and correspond to other non-root nodes of the hierarchical tree. In this context, a "descendant" of a memory lane, such as the main memory lane, refers to a direct descendent, or child, of the memory lane, as well as an indirect descendent (e.g., a grandchild or great grandchild) of the memory lane. A given memory sub-lane may correspond to a leaf node and have no children, and another given memory sub-lane may be a parent to one or multiple children.

A memory manager may assign a set of contiguous virtual memory addresses to the above-described memory lane structure. If the memory lane structure has no memory sub-lanes (i.e., the memory lane structure has a main memory lane and no other memory lanes), then the main memory lane has the same set of contiguous virtual memory addresses. If, however, the memory lane structure has one or multiple memory sub-lanes, then one or multiple subsets of contiguous virtual memory addresses are reserved (or "carved out") from the set of contiguous virtual memory addresses assigned to the memory lane structure. In general, a contiguous set of virtual memory addresses for a child is reserved from the child's parent. In this context, an address being "reserved" from a parent means that the address is no longer part of the parent's assigned set of contiguous virtual memory addresses but rather, the address is now assigned to the child. Therefore, a child of a given memory lane (i.e., a main memory lane or memory sub-lane) may be reserved a corresponding set of contiguous virtual memory addresses from the given memory lane's assigned set of contiguous virtual memory addresses; a grandchild of the given memory lane may be reserved a set of contiguous virtual memory addresses from the set of contiguous virtual memory addresses assigned to the child; a great grandchild of the given memory lane may be reserved a set of contiguous virtual memory addresses assigned to the grandchild; and so forth.

Due to the above-described way in which the virtual memory addresses for a child are reserved from the parent, the child and parent are orthogonal to each other. In this context, a first memory lane being "orthogonal" to a second memory lane refers to no overlap existing between the contiguous set of virtual memory addresses assigned to the first memory lane and the contiguous set of virtual memory addresses assigned to the second memory lane. Because none of the assigned sets of virtual memory addresses overlap, all of the memory lanes of the memory lane structure should be orthogonal with respect to each other.

As will be described below, this memory lane structure is particularly well-suited for storing/managing parallel datasets (i.e., nearly-congruent datasets describing a common characteristic/attribute). Accordingly, like examples of the presently disclosed technology, orthogonal memory lane-based memory management is particularly well-suited for improving dynamic memory region management for HPC applications that process/produce large numbers of parallel datasets during their extended run-times.

For example, the memory lane structure 300 may be used by one or more HPC entities that process/analyze brain lesion imaging. A main memory lane 310 of the memory lane structure 300 may store a first dataset including images of lesions (conceptually represented by the irregular shapes depicted in memory lanes and memory sub-lanes of FIG. 3) associated with a first set of treatment parameters (e.g., method of treatment, drugs used, treatment time, and so forth) and corresponding metadata (conceptually represented by the rectangular shapes depicted in memory lanes and sub-lanes of FIG. 3) representing the treatment parameters. Memory sub-lane 310(*a*), which is a first child of the main memory lane 310, may store a first parallel dataset including lesion images and metadata associated with a second set of treatment parameters refined/modified from the first set of treatment parameters (e.g., prolonged testing, different drugs, different treatment methodology, and so forth). Likewise, memory sub-lane 310(*b*) may store a second parallel dataset including lesion images and metadata associated with a third set of treatment parameters refined/modified from the first set of treatment parameters, and so on. Accordingly, memory sub-lanes 310(*a*)-310(*y*) may all store parallel datasets derived from/dependent on the first dataset stored in main memory lane 310.

As depicted, each of memory sub-lanes 310(*a*)-310(*y*) are parallel (i.e., similar) in structure—and include their own nested/descendant memory sub-lanes. For example, memory sub-lane 310(*a*)(*i*) is a child of memory sub-lane 310(*a*), and memory sub-lane 310(*a*)(*i*)(1) is a child of memory sub-lane 310(*a*)(*i*). Likewise, memory sub-lane 310(*b*)(*i*) is a child of memory sub-lane 310(*b*), and memory sub-lane 310(*b*)(*i*)(1) is a child of memory sub-lane 310(*b*)(*i*), and so on. Here, the first dataset may be stored across memory sub-lane 310(*a*) and its nested/descendant memory sub-lanes (i.e., memory sub-lane 310(*a*)(*i*) and memory sub-lane 310(*a*)(*i*)(1)). Likewise, the second dataset may be stored across memory sub-lane 310(*b*) and its nested/descendant memory sub-lanes (i.e., memory sub-lane 310(*b*)(*i*) and memory sub-lane 310(*b*)(*i*)(1)), and so on. Utilizing this parallel orthogonal memory lane structure to store parallel datasets allows examples of the presently disclosed technology to more easily identify differences across the stored parallel datasets. For example, a first portion/aspect/transformation of the first dataset stored within memory sub-lane 310(*a*)(*i*) may correspond to a first portion/aspect/transformation of the second dataset stored within memory sub-lane 310(*b*)(*i*). Because like portions/aspects/transformations of the first dataset and second dataset are stored in parallel memory sub-lanes (i.e., memory sub-lanes of similar size, structure, and relational locations), they may be analyzed together more easily efficiently.

As alluded to above, examples can be adapted to improve orthogonal memory lane-based memory management in various ways. For instance, memory sub-lanes 310(*a*)-(*d*) (and their descendant memory sub-lanes) may be designated as non-fluid memory sub-lanes. By contrast, memory sub-lanes 310(*x*) and 310(*y*) (along with their descendant memory sub-lanes) may be designated as fluid memory sub-lanes. Accordingly, during the run-time of an HPC application, these non-fluid and fluid memory sub-lanes may be allocated to store parallel datasets according to the parallel datasets' respective data-oriented priority values (i.e., their analytical importance/significance to the HPC application). As alluded to above, memory sub-lanes which descendent from the non-fluid memory sub-lanes may also be designated as non-fluid memory sub-lanes, and may have the same data-oriented priority values as their ancestors. Similarly, memory sub-lanes which descendent from the fluid memory sub-lanes may also be designated as fluid memory sub-lanes, and may have the same data-oriented priority values and fluid memory validity time intervals as their ancestors.

Figure 4:
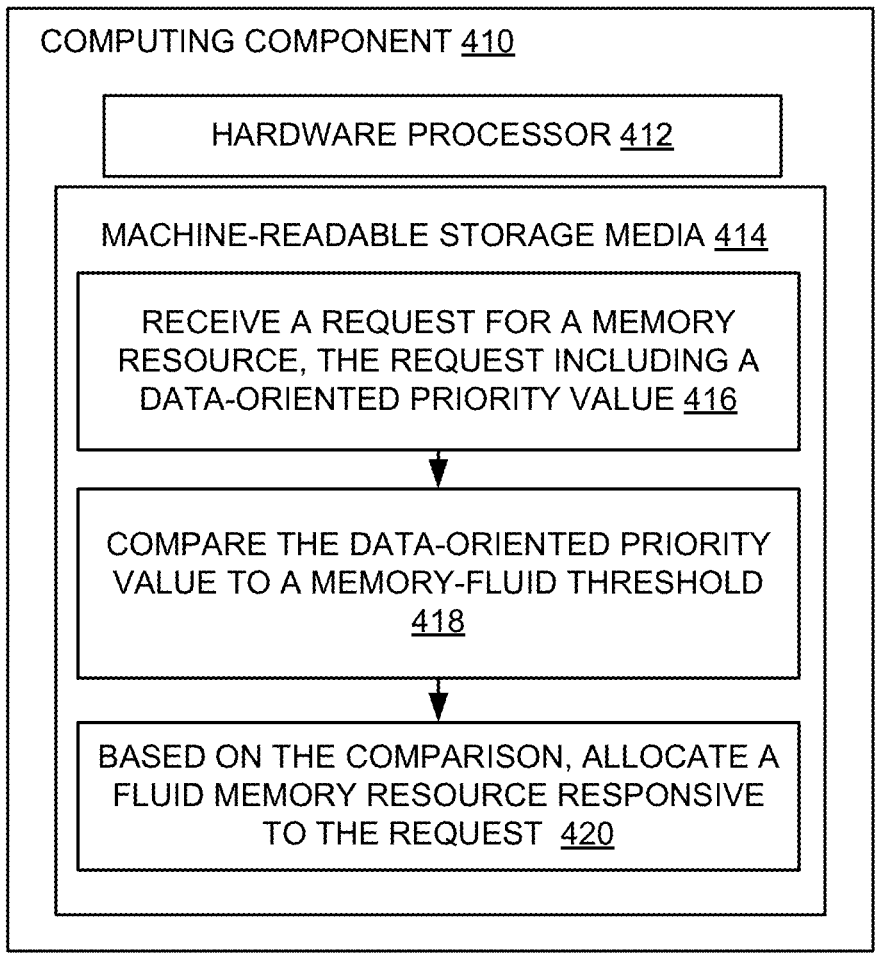
FIG. 4 depicts an example computing system that can be used to allocate a fluid memory region, in accordance with various examples of the presently disclosed technology.

FIG. 4 depicts an example computing system 400 that can be used to allocate a fluid memory region, in accordance with various examples of the presently disclosed technology. In certain examples, computing system 400 may be associated with a memory manager that manages memory regions for one or more computing entities.

Referring now to FIG. 4, computing component 410 may be, for example, a server computer, a controller, or any other similar computing component capable of processing data. In the example implementation of FIG. 4, the computing component 410 includes a hardware processor 412, and machine-readable storage medium for 414.

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 416-420, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 414 may be a non-transitory storage medium, where the term "non-transitory" does not encompass transitory propagating indicators. As described in detail below, machine-readable storage medium 414 may be encoded with executable instructions, for example, instructions 416-420.

As described above, computing system 400 can be used to allocate a fluid memory region, in accordance with various examples of the presently disclosed technology.

Accordingly, hardware processor 412 executes instruction 416 to receive a request for a memory region. The request may include a data-oriented priority value measuring a level of importance for data to be stored in the requested memory region.

In some examples the request may be for a dynamic memory region. In certain examples, the request may be received from a computing entity (e.g., a software application, container, virtual machine, computing node, a cluster of computing nodes, etc.) processing/utilizing the data. In some of these examples, the computing entity may be an HPC entity (e.g., an HPC software application, an HPC computing node, etc.).

As alluded to above, various measurement schemes for data-oriented priority values may be utilized. For example, increasing numerical values may measure increasing/higher levels of importance/priority for stored data or decreasing numerical values may measure increasing/higher levels of importance/priority for stored data. Relatedly, data-oriented priority values may comprise integer and non-integer values, positive, negative, and zero values, etc.

In certain examples, a computing entity requesting the memory region may determine the data-oriented priority value for the data. The computing entity can use various criteria and application-specific and data-specific factors to make this determination. The computing entity may also consider a data-oriented priority-fluidity threshold and/or known fluid memory validity time intervals when making this determination.

In various examples, hardware processor 412 may determine or modify the data-oriented priority value for the data. For example, in some implementations hardware processor 412 can modify the data-oriented priority value for the data based on levels of activity (e.g., number of accesses within a time interval) associated with the data/allocated the memory region storing the data. In certain examples, hardware processor 412 may verify a modification to the data-oriented priority value with the computing entity utilizing the data/allocated memory region prior to implementing the modification.

Hardware processor 412 executes instruction 418 to compare the data-oriented priority value to a data-oriented priority-fluidity threshold. As described above, by comparing the data-oriented priority value to the data-oriented priority-fluidity threshold, hardware processor 412 can determine whether to allocate a fluid memory region or a non-fluid memory region responsive to the request. In particular, if the data-oriented priority value is on a first side of the data-oriented priority-fluidity threshold (i.e., if the level of importance for the data measured by the data-oriented priority value fails to exceed a threshold level of importance measured by the data-oriented priority-fluidity threshold), hardware processor 412 may allocate a fluid memory region for the data. By contrast, if the data-oriented priority value is on a second side of the data-oriented priority-fluidity threshold (i.e., if the level of importance for the data measured by the data-oriented priority value exceeds the threshold level of importance measured by the data-oriented priority-fluidity threshold), hardware processor 412 may allocate a non-fluid memory region for the data.

Based on the comparison of instruction 418, hardware processor 412 executes instruction 420 to allocate a fluid memory region for the data. As described above, this may be the case when the level of importance for the data measured by the data-oriented priority value fails to exceed a threshold level of importance measured by the data-oriented priority-fluidity threshold.

As alluded to above, upon expiration of a fluid memory validity time interval for the allocated fluid memory region, the allocated fluid memory region may be automatically relinquished to a free pool of memory regions. In various instances, hardware processor 412 may determine the fluid memory validity time interval for the allocated fluid memory region based on the data-oriented priority value for the data (e.g., the determined fluid memory validity time interval may increase as the level of importance for data increases).

In certain cases, hardware processor 412 can store/organize (in e.g., a lookup table or hash table) a unique identifier/handle used to access the allocated fluid memory region according to the data-oriented priority value such that the hardware processor 412 can provide access to the allocated fluid memory region more quickly than for other allocated fluid memory regions having data-oriented priority values associated with lower levels of importance. More generally, hardware processor 412 can store/organize unique identifiers (in e.g., a lookup table or hash table) used to access allocated memory regions according to the allocated memory regions' respective data-oriented priority values such that hardware processor 412 can provide access to allocated memory regions having data-oriented priority values associated with higher levels of importance more quickly than for other allocated memory regions having data-oriented priority values associated with lower levels of importance.

In various cases, prior to expiration of the fluid memory validity time interval, hardware processor 412 may receive an updated data-oriented priority value measuring an updated level of importance for the data stored in the allocated fluid memory region. Like the request of instruction 416, the new/updated request may be received from a computing entity processing/utilizing the data. In response to receiving the new/updated request, hardware processor 412 can compare the updated data-oriented priority value to the data-oriented priority-fluidity threshold. If the updated data-oriented priority value is on the second side of the data-oriented priority-fluidity threshold (i.e., if the updated level of importance for the data measured by the updated data-oriented priority value exceeds the threshold level of importance measured by the data-oriented priority-fluidity threshold), hardware processor 412 may switch the allocated fluid memory region to a non-fluid memory region that is not automatically relinquished to the free pool of memory regions upon expiration of the fluid memory validity time interval. If the updated data-oriented priority value is still on the first side of the data-oriented priority-fluidity threshold (i.e., if the updated level of importance for the data measured by the updated data-oriented priority value fails to exceed the threshold level of importance measured by the data-oriented priority-fluidity threshold), hardware processor 412 may not switch the allocated fluid memory region to a non-fluid memory region. However, in certain examples hardware processor 412 may update the fluid memory validity time interval to reflect the updated data-oriented priority value/level of importance for the data (e.g., if the updated level of importance for the data as measured by the updated data-oriented priority value increases, hardware processor may increase the fluid memory validity time interval). Likewise, hardware processor 412 may store/reorganize the allocated fluid memory region's unique identifier(s) in accordance with its updated data-oriented priority value/level of importance.

Figure 5:
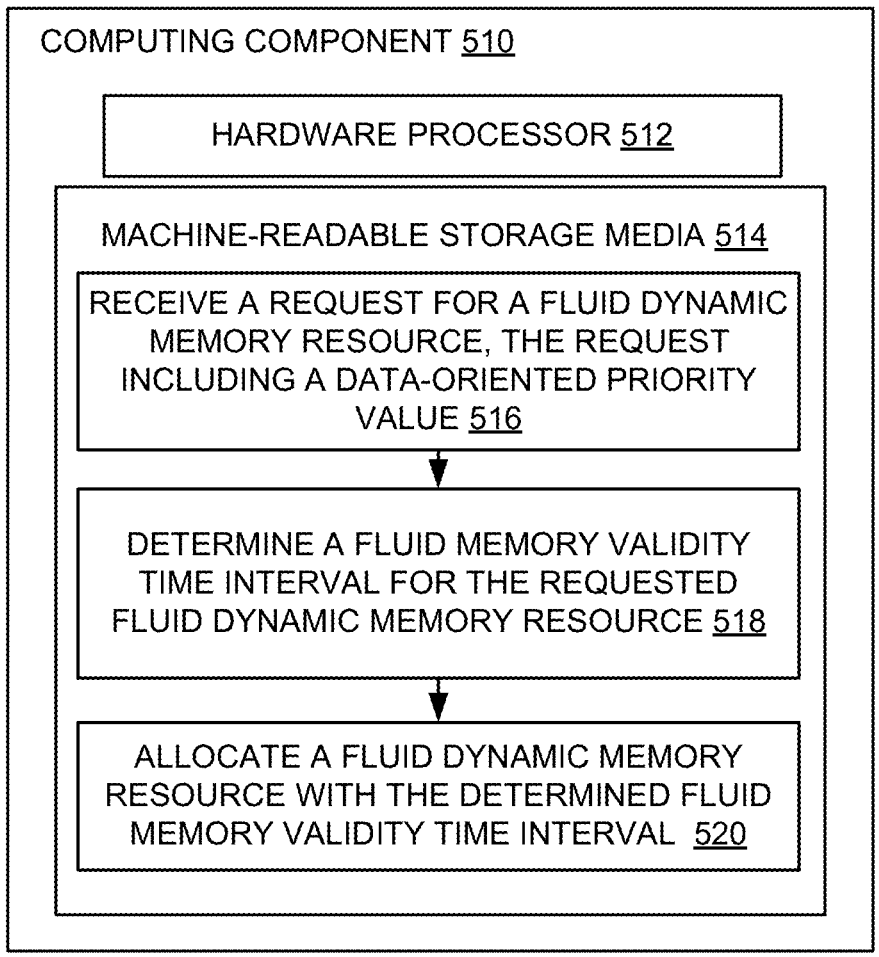
FIG. 5 depicts another example computing system that can be used to allocate a fluid memory region, in accordance with various examples of the presently disclosed technology.

FIG. 5 depicts an example computing system 500 that can be used to allocate a fluid dynamic memory region, in accordance with various examples of the presently disclosed technology. In certain examples, computing system 500 may be associated with a memory manager that manages memory regions for one or more computing entities.

Referring now to FIG. 5, computing component 510 may be, for example, a server computer, a controller, or any other similar computing component capable of processing data. In the example implementation of FIG. 5, the computing component 510 includes a hardware processor 512, and machine-readable storage medium for 514 storing instructions 516-520. Here computing component 510, hardware processor 512 and machine-readable storage medium for 514 may be the same/similar as their corresponding components described in conjunction with FIG. 4, and will not be described again for brevity.

Hardware processor 512 executes instruction 516 to receive, from a computing entity (e.g., a software application, container, virtual machine, computing node, a cluster of computing nodes, etc.), a request for a fluid dynamic memory region. In some examples, the computing entity may be an HPC entity (e.g., an HPC software application, an HPC computing node, etc.).

The request may include a data-oriented priority value measuring a level of importance for data to be stored in the requested fluid dynamic memory region. As alluded to above, different measurement schemes may be utilized for data-oriented priority values. For example, increasing numerical values may measure increasing/higher levels of importance/priority for stored data or decreasing numerical values may measure increasing/higher levels of importance/priority for stored data. Relatedly, data-oriented priority values may comprise integer and non-integer values, positive, negative, and zero values, etc.

In certain examples, the computing entity may determine the data-oriented priority value for the data. The computing entity can use various criteria and application-specific and data-specific factors to make this determination. The computing entity may also consider a data-oriented priority-fluidity threshold and/or known fluid memory validity time intervals when making this determination. In these examples, prior to receiving the request of instruction 516, hardware processor 512 may (1) receive a query from the computing entity requesting information related to the data-oriented priority-fluidity threshold and or fluid memory validity time intervals for fluid dynamic regions; and (2) provide the requested information responsive to the request. For example, hardware processor 512 may provide information related to the data-oriented priority-fluidity threshold in response to a query/request from the computing entity. The information may include the value of the data-oriented priority-fluidity threshold. Alternatively (or in addition) to the value of the data-oriented priority-fluidity threshold, hardware processor 512 may provide the computing entity with a first range of data-oriented priority values for data to be stored in fluid dynamic memory regions and a second range of data-oriented priority values for data to be stored in non-fluid dynamic memory regions. Accordingly, based on this information and application-specific and data-specific factors, the computing entity can determine the data-oriented priority value for the data. As alluded to above, in certain examples hardware processor 512 may determine the data-oriented priority value for the data instead of the computing entity.

In certain examples the request may also include a requested/desired fluid memory validity time interval. For example, computing entity may predict that it will continue to process/utilize the data for a two-month time interval (i.e., the computing entity may predict that the data will not diminish in importance until expiration of a two-month period). Accordingly, when requesting the fluid dynamic memory region for the data, the computing entity may request e.g., a three-month fluid memory validity time interval. Alternatively (or in addition to requesting a three-month fluid memory validity time interval for the data), the computing entity may consider the time interval it predicts that it will process/utilize the data when determining the data-oriented priority value for the data.

Hardware processor 512 executes instruction 518 to determine a fluid memory validity time interval for the requested fluid dynamic memory region. In examples where the computing entity includes a requested/desired fluid memory validity time interval in its request for the fluid dynamic memory region, hardware processor 512 may determine the fluid memory validity time interval in accordance with the requested/desired fluid memory validity time interval. In other examples, hardware processor 512 may determine the fluid memory validity time interval for the requested fluid dynamic memory region based on the data-oriented priority value. For example, the determined fluid memory validity time interval may increase as the level of importance for data increases (as measured by the data-oriented priority value for the data).

Hardware processor 512 executes instruction 520 to allocate, for the data, a fluid dynamic memory region with the determined fluid memory validity time interval.

As alluded to above, upon expiration of the determined fluid memory validity time interval for the allocated fluid dynamic memory region, the allocated fluid dynamic memory region may be automatically relinquished to a free pool of dynamic memory regions.

Figure 6:
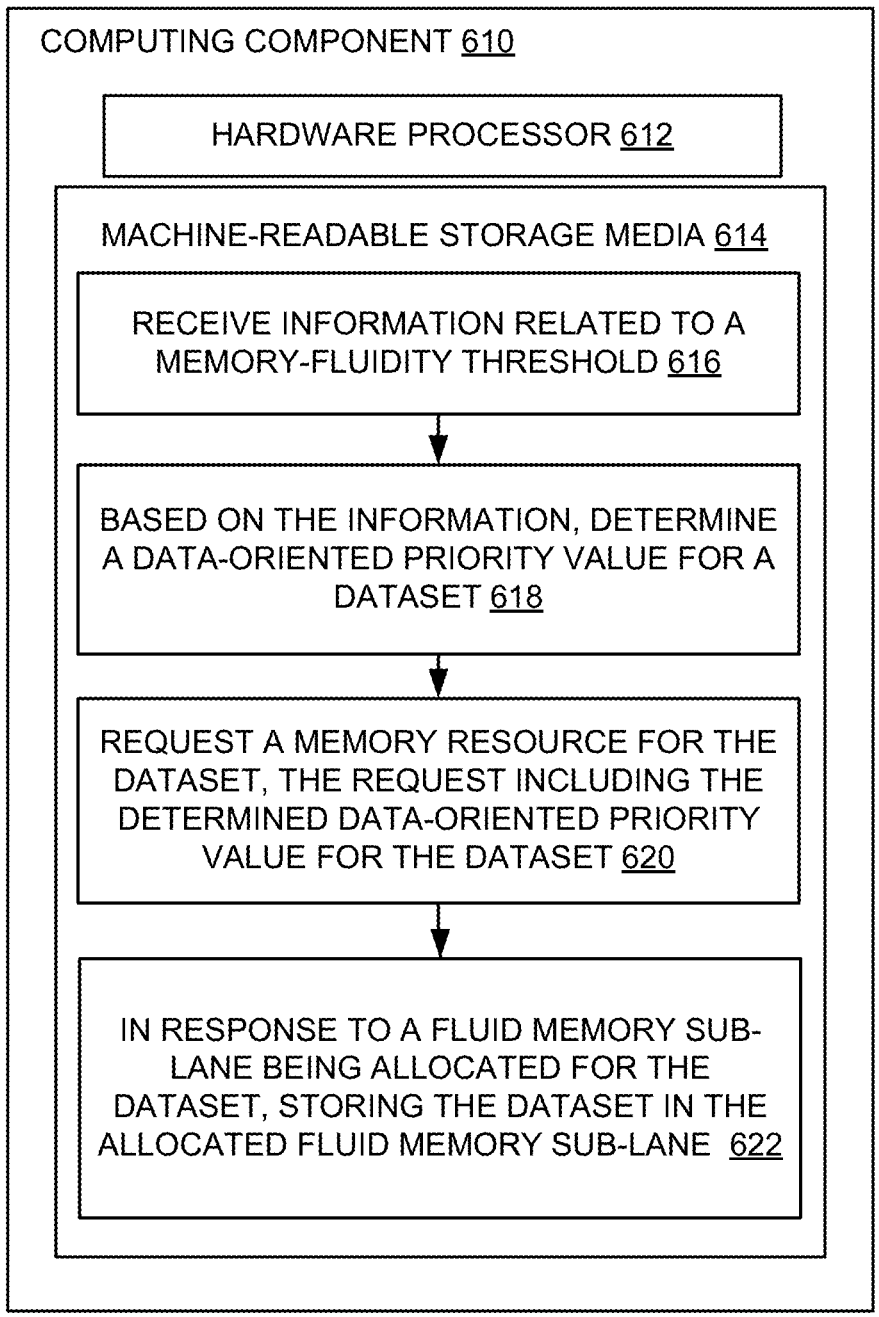
FIG. 6 depicts an example computing system that can be used to request a memory region for a dataset with a determined data-oriented priority value, in accordance with various examples of the presently disclosed technology.

FIG. 6 depicts an example computing system 600 that can be used to request a memory region for a dataset with a determined data-oriented priority value, in accordance with various examples of the presently disclosed technology.

Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614 storing instructions 616-620. Here computing component 610, hardware processor 612 and machine-readable storage medium for 614 may be the same/similar as their corresponding components described in conjunction with FIG. 4, and will not be described again for brevity.

As alluded to above, examples of the presently disclosed technology may also include computing entities (e.g., software applications, containers, virtual machines, computing nodes, etc.) that collaborate with a memory management system to improve region utilization for memory regions. Here, computing system 600 may be associated with such a computing entity.

Accordingly, hardware processor 612 executes instruction 616 to receive, from a memory management system (e.g., a memory management system associated with computing systems 400 or 500), information related to a data-oriented priority-fluidity threshold. As described above, the data-oriented priority-fluidity threshold may be used to designate/differentiate non-fluid and fluid memory regions. In particular, if a data-oriented priority value for a given dataset is on a first side of the data-oriented priority-fluidity threshold (i.e., if the level of importance for the dataset measured by the data-oriented priority value fails to exceed a threshold level of importance measured by the data-oriented priority-fluidity threshold), the memory management system may allocate a fluid memory region for the dataset. By contrast, if the data-oriented priority value for the given dataset is on a second side of the data-oriented priority-fluidity threshold (i.e., if the level of importance for the dataset measured by the data-oriented priority value exceeds the threshold level of importance measured by the data-oriented priority-fluidity threshold), the memory management system may allocate a fluid memory region for the data.

The received information related to the data-oriented priority-fluidity threshold may include the value of the data-oriented priority-fluidity threshold. Alternatively (or in addition) to the value of the data-oriented priority-fluidity threshold, the received information may include a first range of data-oriented priority values for data to be stored in fluid memory regions and a second range of data-oriented priority values for data to be stored in non-fluid memory regions.

In various cases, the received information related to the data-oriented priority-fluidity threshold may be provided by the memory management system in response to a request made by hardware processor 612.

Hardware processor 612 executes instruction 618 to determine a data-oriented priority value for a dataset based in part on the received information related to the data-oriented priority-fluidity threshold. As alluded to above, in addition to the received information related to the data-oriented priority-fluidity threshold, hardware processor 612 can use various criteria and application-specific and data-specific factors to make this determination.

Hardware processor 612 executes instruction 620 to request, from the memory management system, a memory region for the dataset, the request including the determined data-oriented priority value for the dataset.

In response to the memory management system allocating a first fluid memory sub-lane for the dataset, hardware processor 612 executes instruction 622 to store the dataset in the allocated first fluid memory sub-lane. Upon expiration of a fluid memory validity time interval the allocated first fluid memory sub-lane may be automatically relinquished to a free pool of memory.

As alluded to above, examples can be specially adapted to improve other innovative dynamic memory region management systems/techniques, such as orthogonal memory lane-based memory management. As used herein, orthogonal memory lane-based memory management may refer to a virtual memory management scheme (also called a "memory lane-based virtualization") in which virtual memory is allocated in hierarchical memory lane structures. For example, a memory lane structure may be organized as a hierarchical tree of memory lanes, including a "main memory lane" and one or multiple additional memory lanes, called "memory sub-lanes." A main memory lane and a memory sub-lane are both examples of "memory lanes." The main memory lane may correspond to the root node of the hierarchical tree. The one or multiple memory sub-lanes are descendants of the main memory lane and correspond to other non-root nodes of the hierarchical tree. In this context, a "descendant" of a memory lane, such as the main memory lane, refers to a direct descendent, or child, of the memory lane, as well as an indirect descendent (e.g., a grandchild or great grandchild) of the memory lane. A given memory sub-lane may correspond to a leaf node and have no children, and another given memory sub-lane may be a parent to one or multiple children. Here, a first memory lane being "orthogonal" to a second memory lane refers to no overlap existing between the contiguous set of virtual memory addresses that are assigned to the first memory lane and the contiguous set of virtual memory addresses that are assigned to the second memory lane. Because none of the assigned sets of virtual memory addresses overlap, in accordance with example implementations, all of the memory lanes of the memory lane structure should be orthogonal with respect to each other.

As described above, like memory management systems of the presently disclosed technology, orthogonal memory lane-based memory management is particularly well-suited for improving dynamic memory sources management for HPC applications that process/produce large numbers of parallel datasets during their extended run-times.

Examples can be adapted to improve orthogonal memory lane-based memory management in various ways. For example, a first set of memory sub-lanes may be designated as non-fluid memory sub-lanes. By contrast, a second set of memory sub-lanes may be designated as fluid memory sub-lanes. Accordingly, during the run-time of an HPC application, these non-fluid and fluid memory sub-lanes may be allocated to parallel datasets according to the parallel datasets' respective data-oriented priority values (i.e., their analytical importance/significance to the HPC application). Memory sub-lanes which descendent from the non-fluid memory sub-lanes may also be designated as non-fluid memory sub-lanes, and may have the same data-oriented priority values as their ancestors. Similarly, memory sub-lanes which descendent from fluid memory sub-lanes may also be designated as fluid memory sub-lanes, and may have the same data-oriented priority values and fluid memory validity time intervals as their ancestors.

Referring again to FIG. 6, the first fluid memory sub-lane may be a child of a first memory lane and the first fluid memory sub-lane may be orthogonal to the first memory lane. In some examples, the allocated first fluid memory sub-lane may be a parent to a second fluid memory sub-lane, and allocating the first fluid memory sub-lane may also comprise allocating the second fluid memory sub-lane. Accordingly, the allocated first fluid memory sub-lane and the allocated second fluid memory sub-lane may share the same data-oriented priority value and the same fluid memory validity time interval.

In various examples, hardware processor 612 may execute further instructions that cause hardware processor 612 to: (1) determine a second data-oriented priority value for a second dataset, the second data-oriented priority value measuring a level of importance for the second dataset; (2) request, from the memory management system, a second memory region for storing the second dataset, the request including the second data-oriented priority value; and (3) in response to the memory manager allocating a first non-fluid memory sub-lane for the second dataset, store the second dataset in the first non-fluid memory lane.

Here, the first non-fluid memory sub-lane may also be a child of the first memory lane and the first non-fluid memory sub-lane may be orthogonal for the first memory lane. Also, the data-oriented priority value for the first dataset may lie on a first side of a data-oriented priority-fluidity threshold (i.e., the level of importance for the first dataset measured by the data-oriented priority value for the first dataset fails to exceed a threshold level of importance measured by the data-oriented priority-fluidity threshold) and the second data-oriented priority value for the second dataset may lie on a second side of the data-oriented priority-fluidity threshold (i.e., the level of importance for the second dataset measured by the second data-oriented priority value exceeds the threshold level of importance measured by the data-oriented priority-fluidity threshold). Here, the first dataset and the second dataset may be parallel datasets utilized by a computing entity associated with hardware processor 612. As described above, the parallel datasets may be nearly congruent datasets describing a common characteristic.

Figure 7:
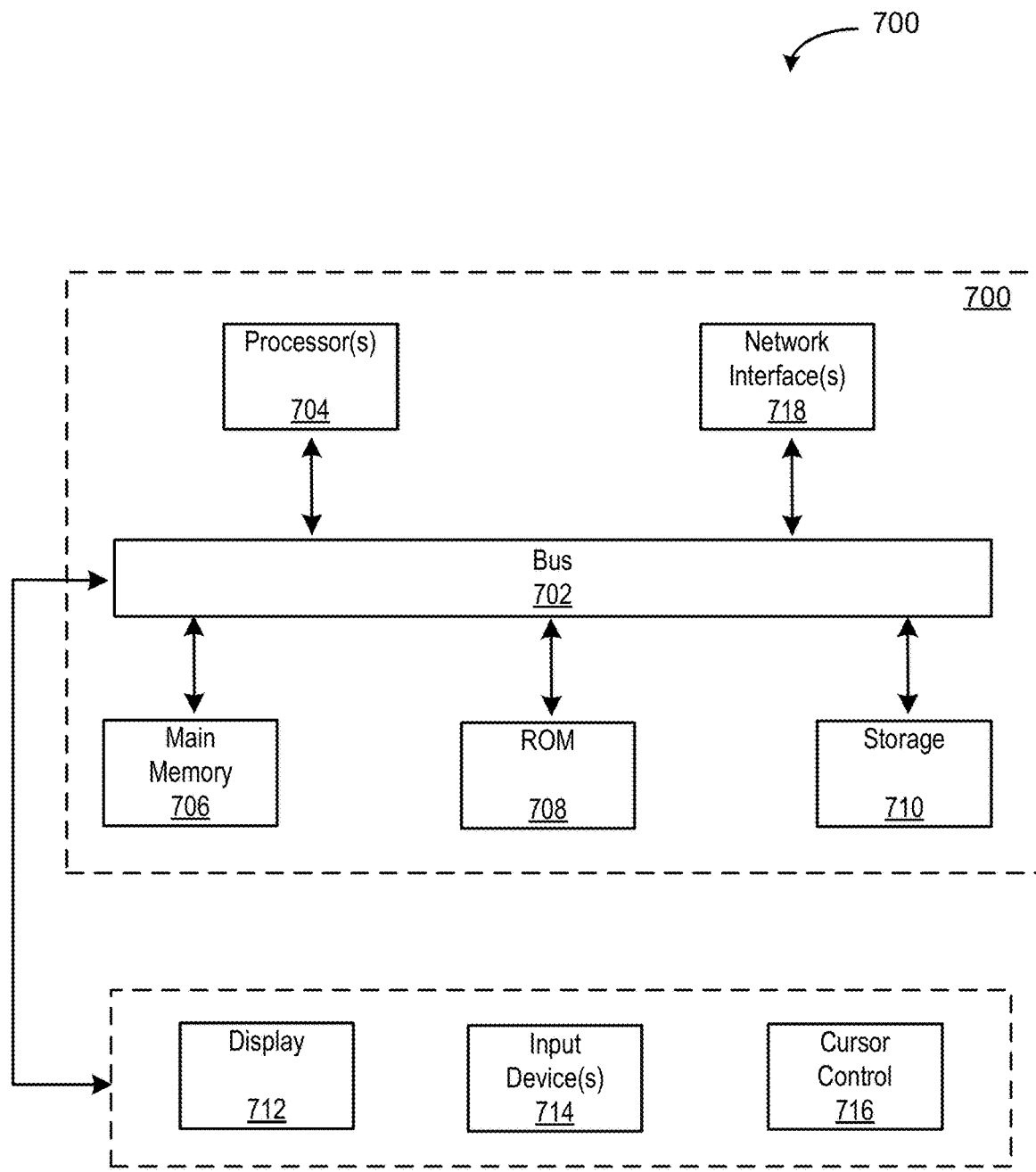
FIG. 7 depicts a block diagram of an example computer system in which various of the examples described herein may be implemented.

FIG. 7 depicts a block diagram of an example computer system 700 in which various of the embodiments described herein may be implemented. In various examples computing system 700 may be used to implement computing systems 500 and 600 described in conjunction with FIGS. 5 and 6 respectively.

The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method performed by a memory manager comprising:
    receiving a request for a memory region, the request including a data-oriented priority value measuring a level of importance for data to be stored in the requested memory region;
    comparing the data-oriented priority value to a data-oriented priority-fluidity threshold;
    based on the comparison, allocating a fluid memory region for the data, wherein, upon expiration of a fluid memory validity time interval for the allocated fluid memory region the allocated fluid memory region is automatically relinquished to a free pool of memory regions; and
    storing a unique identifier for the allocated fluid memory region according to the data-oriented priority value such that the memory manager provides access to the allocated fluid memory region more quickly than the memory manager provides access to other allocated fluid memory regions having lower associated data-oriented priority values.

2. The method of claim 1, further comprising:
    determining the fluid memory validity time interval for the allocated fluid memory region based on the data-oriented priority value.

3. The method of claim 1, wherein the request is received from a high-performance computing entity.

4. The method of claim 1, further comprising:
    prior to expiration of the fluid memory validity time interval, receiving an updated data-oriented priority value measuring an updated level of importance for the data stored in the allocated fluid memory region;
    comparing the updated data-oriented priority value to the data-oriented priority-fluidity threshold; and
    switching the allocated fluid memory region to a non-fluid memory region that is not automatically relinquished to the free pool of memory regions upon expiration of the fluid memory validity time interval.

5. A non-transitory computer-readable medium storing instructions, which when executed by one or more processing resources, cause the one or more processing resources to perform a method comprising:
    receiving, from a computing entity, a request for a fluid dynamic memory region, the request including a data-oriented priority value measuring a level of importance for data to be stored in the requested fluid dynamic memory region;
    determining a fluid memory validity time interval for the requested fluid dynamic memory region;
    updating the determined fluid memory validity time interval for the allocated fluid dynamic memory region in response to a request from the computing entity,
    allocating, for the data, a fluid dynamic memory region with the determined fluid memory validity time interval, wherein, upon expiration of the determined fluid memory validity time interval the allocated fluid dynamic memory region is automatically relinquished to a free pool of dynamic memory regions.

6. The non-transitory computer-readable medium storing instructions of claim 5, wherein determining the fluid memory validity time interval for the requested fluid dynamic memory region comprises determining the fluid memory validity time interval based on the data-oriented priority value.

7. The non-transitory computer-readable medium storing instructions of claim 5, wherein the method further comprises:
storing a unique identifier for the allocated fluid dynamic memory region according to the allocated fluid dynamic memory region's data-oriented priority value such that access to the allocated fluid dynamic memory region can be provided more quickly than access to other allocated fluid dynamic memory regions having lower associated data-oriented priority values.

8. The non-transitory computer-readable medium storing instructions of claim 5, wherein the method further comprises, prior to receiving, from the computing entity, the request for the fluid dynamic memory region:
providing, to the computing entity, information related to a data-oriented priority-fluidity threshold, wherein:
data-oriented priority values for data to be stored in fluid dynamic memory regions lie on a first side of the data-oriented priority-fluidity threshold, and
data-oriented priority values for data to be stored in non-fluid dynamic memory regions lie on a second side of the data-oriented priority-fluidity threshold.

9. The non-transitory computer-readable medium storing instructions of claim 8, wherein providing the information related to the data-oriented priority-fluidity threshold comprises:
providing, to the computing entity, a first range of data-oriented priority values for data to be stored in fluid dynamic memory regions and a second range of data-oriented priority values for data to be stored in non-fluid dynamic memory regions.

10. The non-transitory computer-readable medium storing instructions of claim 8, wherein the information related to the data-oriented priority-fluidity threshold is provided to the computing entity in response to a query, from the computing entity, for information related to the data-oriented priority-fluidity threshold.

11. A system comprising:
one or more processing resources; and
a non-transitory computer-readable medium, coupled to the one or more processing resources, having stored therein instructions that when executed by the one or more processing resources cause the system to perform a method comprising:
determining a data-oriented priority value for a dataset, the data-oriented priority value measuring a level of importance for data to be stored in the requested memory region;
requesting, from a memory manager, a memory region for storing the dataset, the request including the data-oriented priority value;
in response to the memory manager allocating a first fluid memory sub-lane for the data responsive to the request, storing the data in the allocated first fluid memory sub-lane, wherein:
the first fluid memory sub-lane is a child of a first memory lane,
the first fluid memory sub-lane is orthogonal to the first memory lane,
upon expiration of a fluid memory validity time interval, the allocated first fluid memory sub-lane is automatically relinquished to a free pool of memory.

12. The system of claim 11, wherein the method further comprises, prior to requesting the memory region:
requesting, from the memory manager, information related to a data-oriented priority-fluidity threshold, wherein:
data-oriented priority values for data to be stored in fluid memory sub-lanes lie on a first side of the data-oriented priority-fluidity threshold, and
data-oriented priority values for data to be stored in non-fluid memory sub-lanes lie on a second side of the data-oriented priority-fluidity threshold; and
receiving, from the memory manager, information related to the data-oriented priority-fluidity threshold.

13. The system of claim 12, wherein determining the data-oriented priority value for the dataset comprises:
determining the data-oriented priority value for the requested memory region based in part on the information related to the data-oriented priority-fluidity threshold.

14. The system of claim 11, wherein requesting, from the memory manager, the memory region comprises:
requesting the fluid memory region with the fluid memory validity time interval.

15. The system of claim 11, wherein:
the allocated first fluid memory sub-lane is a parent to a second fluid memory sub-lane;
the second fluid memory sub-lane is orthogonal to the allocated first fluid memory sub-lane;
allocating the first fluid memory sub-lane also comprises allocating the second fluid memory sub-lane; and
the allocated first fluid memory sub-lane and the allocated second fluid memory sub-lane share the same data-oriented priority value and the same fluid memory validity time interval.

16. The system of claim 11, wherein the method further comprises:
determining a second data-oriented priority value for a second dataset, the second data-oriented priority value measuring a level of importance for the second dataset;
requesting, from the memory manager, a second memory region for storing the second dataset, the request including the second data-oriented priority value; and
in response to the memory manager allocating a first non-fluid memory sub-lane for the second dataset, storing the second dataset in the first non-fluid memory lane, wherein:
the first non-fluid memory sub-lane is a child of the first memory lane, and
the first non-fluid memory sub-lane is orthogonal for the first memory lane.

17. The system of claim 16, wherein the data-oriented priority value for the first dataset lies on a first side of a data-oriented priority-fluidity threshold and the second data-oriented priority value for the second dataset lies on a second side of the data-oriented priority-fluidity threshold.

18. The system of claim 16, wherein the dataset and the second data comprise nearly congruent parallel datasets describing a common characteristic.

* * * * *